United States Patent
Adermann et al.

(10) Patent No.: US 8,800,491 B2
(45) Date of Patent: Aug. 12, 2014

(54) INDEXED ANIMAL FEEDER

(71) Applicant: The GSI Group, LLC, Assumption, IL (US)

(72) Inventors: James M. Adermann, Taylorville, IL (US); John Frankovich, Decatur, IL (US)

(73) Assignee: The GSI Group, LLC, Assumption, IL (US)

( * ) Notice: Subject to any disclaimer, the term of this patent is extended or adjusted under 35 U.S.C. 154(b) by 10 days.

(21) Appl. No.: 13/660,611

(22) Filed: Oct. 25, 2012

(65) Prior Publication Data

US 2013/0098299 A1    Apr. 25, 2013

Related U.S. Application Data

(60) Provisional application No. 61/551,309, filed on Oct. 25, 2011.

(51) Int. Cl.
    *A01K 5/00*    (2006.01)
    *A01K 5/01*    (2006.01)
    *A01K 7/06*    (2006.01)

(52) U.S. Cl.
    USPC ........................................ 119/53; 119/53.5

(58) Field of Classification Search
    USPC ........ 119/53, 53.5, 52.1, 54, 56.1, 57.4, 61.1, 119/61.2, 62
    See application file for complete search history.

(56) References Cited

U.S. PATENT DOCUMENTS

| | | | |
|---|---|---|---|
| 4,491,087 A * | 1/1985 | Herring, Sr. | 119/53.5 |
| 5,570,656 A | 11/1996 | Waldner et al. | |
| 6,253,705 B1 * | 7/2001 | Pollock et al. | 119/53.5 |
| 7,134,402 B2 | 11/2006 | Bondarenko et al. | |
| 7,819,083 B2 | 10/2010 | Bondarenko et al. | |
| 8,015,944 B2 * | 9/2011 | Bondarenko et al. | 119/53 |
| 8,322,306 B2 * | 12/2012 | Bondarenko et al. | 119/53.5 |
| 8,459,204 B2 * | 6/2013 | Lato | 119/53 |
| 2010/0180825 A1 | 7/2010 | Kleinsasser | |
| 2011/0253052 A1 | 10/2011 | Bondarenko et al. | |
| 2013/0283943 A1 * | 10/2013 | Nagai | 74/89 |

FOREIGN PATENT DOCUMENTS

KR    200188530 Y1    7/2000

OTHER PUBLICATIONS

International Search Report from corresponding International Application No. PCT/US2012/061869, mailed Feb. 27, 2013.
Written Opinion from corresponding International Application No. PCT/US2012/061869, mailed Feb. 27, 2013.

* cited by examiner

*Primary Examiner* — Yvonne Abbott
(74) *Attorney, Agent, or Firm* — Polster Lieder

(57) ABSTRACT

An animal feeder is provided having a movable gate between a hopper portion and a trough portion of the feeder. An adjustment mechanism is positioned on the hopper wall above gate and is operable to adjust the position of the gate, and hence, the size of the opening between the hopper and trough. The adjustment mechanism allows for easy control of the size of the opening between the hopper and the trough.

35 Claims, 13 Drawing Sheets

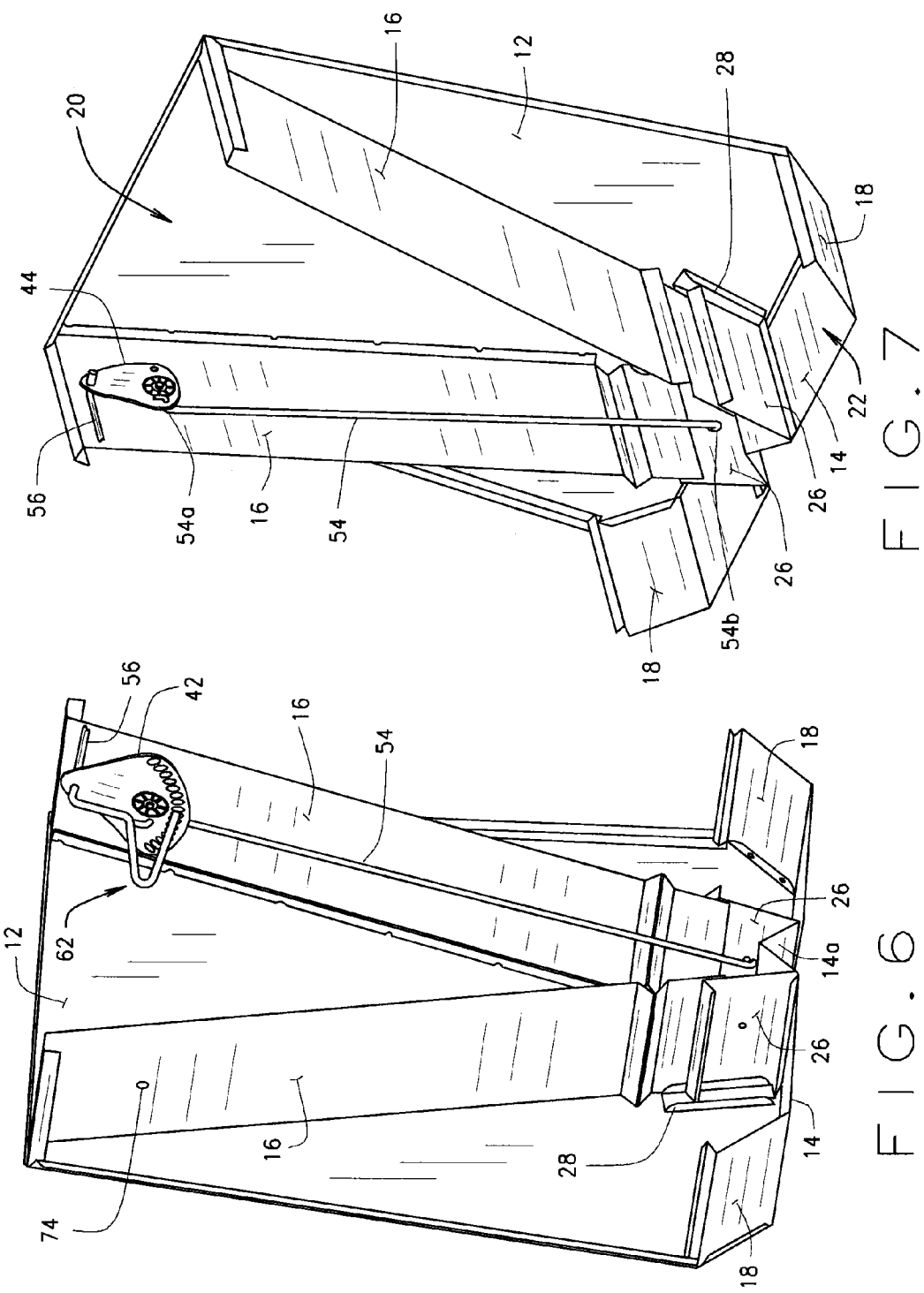

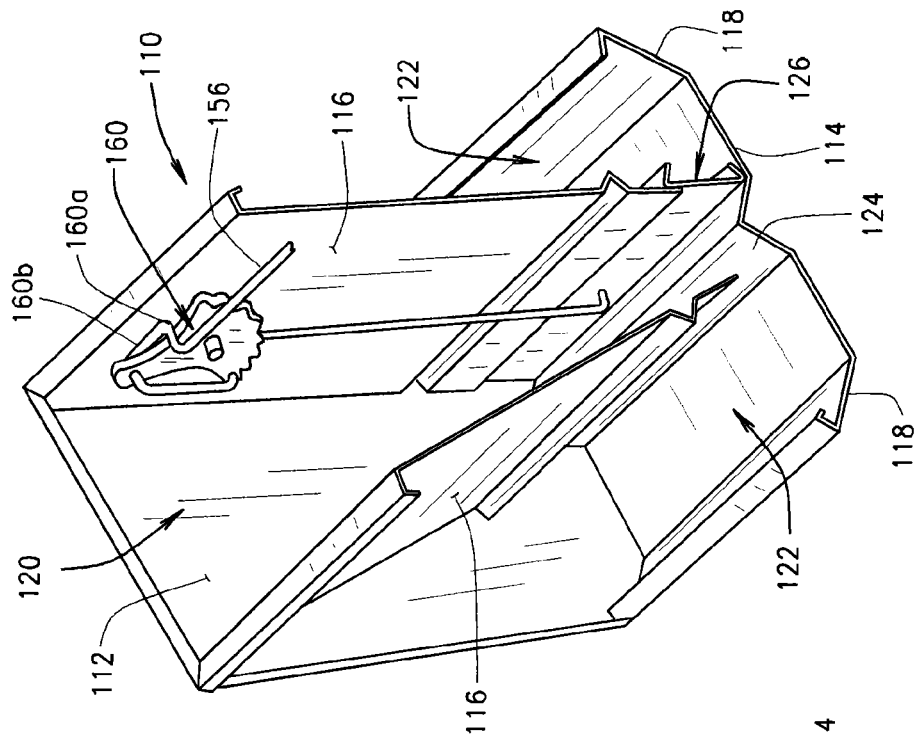
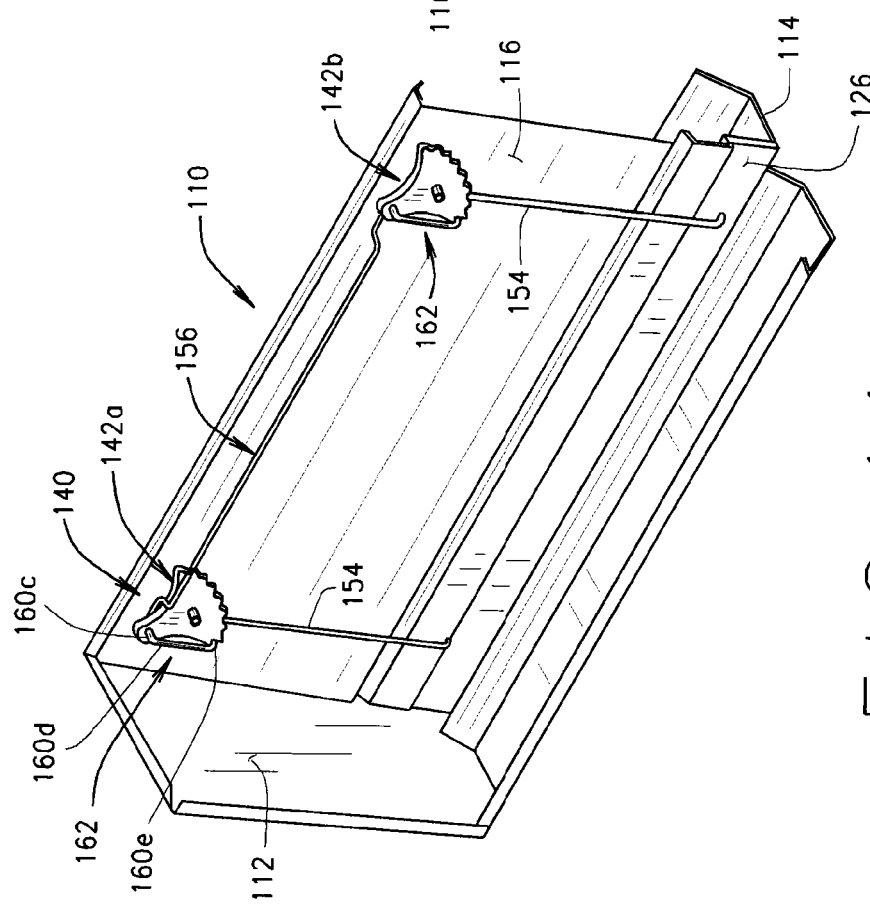

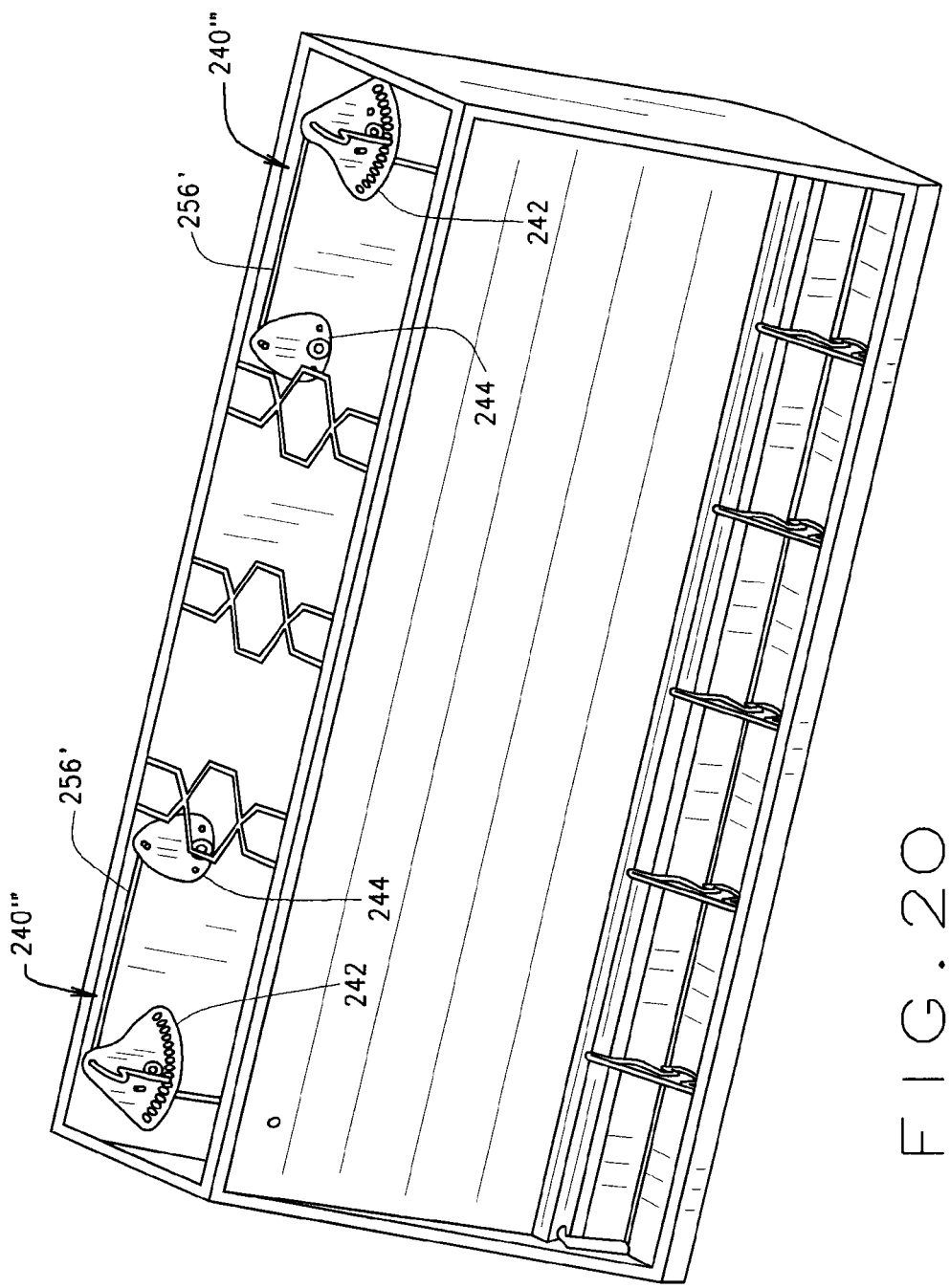

US 8,800,491 B2

INDEXED ANIMAL FEEDER

CROSS-REFERENCE TO RELATED APPLICATIONS

This application claims priority to U.S. App. No. 61/551,309 filed Oct. 25, 2011 and which is incorporated herein by reference.

STATEMENT REGARDING FEDERALLY SPONSORED RESEARCH OR DEVELOPMENT

Not applicable.

BACKGROUND OF THE INVENTION

This application relates generally to animal feeders, such as hog feeders, and in particular to an indexed feeder.

Animal feeders which are used to feed animals, such as hogs, in animal raising facilities typically include a hopper into which feed is delivered and at least one trough which receives the feed from the hopper. In one current construction, the hopper and trough are constructed essentially as one unit, and the hopper includes an opening at its bottom, and feed flows through this opening into the trough.

Such feeders work acceptably. However, they do not allow for adjustment of the opening, and thus the rate at which feed is delivered from the hopper to the trough cannot be controlled. Some hoppers include gates which can be raised and lowered to adjust the effective size of the hopper opening, and hence, the rate at which feed is delivered from the hopper into the trough. However, in many of these hoppers, it is difficult to accurately adjust the position of the gate. It would be desirable to provide a hopper in which the position of the gate (and hence the effective size of the opening from the hopper to the trough) can be more easily and precisely controlled.

SUMMARY

Briefly stated, an adjustment mechanism is provided for altering the effective size of an opening between a hopper and trough of an animal feeder and an animal feeder incorporating the adjustment mechanism.

The animal feeder comprises a hopper and at least one trough. The hopper is defined by a bottom surface, opposed end walls, and opposed hopper walls. At least one of the hopper walls has a bottom edge spaced above the bottom surface of the hopper to define an opening. The trough is defined by a bottom surface, opposed end walls, a trough wall, and a portion of the at least one of the hopper walls. The opening places the hopper in communication with the trough. A gate extends the length of the opening and is movable by the adjustment mechanism to adjust the effective height of the opening.

In accordance with one aspect of the invention, the adjustment mechanism comprises a first cam and a second cam, each of which are rotatably mounted to the at least one hopper wall. The first and second cams are horizontally spaced apart from each other and each rotates about a pivot axis. A first link extends between and connects the first cam to the gate and a second link extends between and connects the second cam to the gate. The first and second links are connected to the first and second cams, respectively, at a point on the cams spaced from the pivot points of the cams, such that rotation of the cams is translated to vertical motion of the links.

In accordance with one aspect of the invention, a control rod extends between the first and second cams to rotationally connect the first and second cams, such that the cams rotate about their pivot axes in unison. The control rod is connected to the cams at points on the cams such that movement of the control rod induces rotation of the cams about their pivot axes.

At least the first cam is a control cam and comprises two or more position adjusting openings spaced from the pivot axis for the control cam. The control rod comprises a finger sized to engage a selected one of the adjustment position openings. The position adjusting openings are preferably arranged in an arc, and the arc is preferably generally horizontal when the control cam is generally vertically oriented. In accordance with one embodiment, the arc of the position adjusting openings is positioned generally below the pivot axis for the first cam. The control rod can define a handle, and the handle can include the finger.

In accordance with one embodiment of the adjustment mechanism, the second cam also comprises a control cam, such that the adjustment mechanism includes two control cams. In accordance with this embodiment, the control arm includes a second handle and second finger which is positioned and sized to be selectively engagable with a selected one of the adjustment positioning openings of the second control cam. In this embodiment, the position of the gate can be adjusted using either of the handles, and either handle will control both of the control cams in cooperation. With the two control cams positioned on either side of the feeder, the position of the gate can be adjusted from either side of the feeder. In this embodiment, the control arm is made of a material sufficiently stiff such that disengagement of either the first or second finger its associated control cam disengages the other of the first and second finger from its associated control cam.

In accordance with another embodiment of the adjustment mechanism, the second cam is a controlled cam. The control cam and the controlled cam are proximate the end walls of the hopper. In this embodiment, the adjustment mechanism can be operated only from one end of the feeder, and hence, the position of the gate can be adjusted from only one end of the feeder. In addition, a second handle could be incorporated proximate the controlled cam such that the mechanism could be operated from either end of the feeder.

In accordance with another aspect of the hopper, the hopper can include an adjustment mechanism at opposite ends of the hopper wall, and each adjustment mechanism includes a control cam. In accordance with this aspect, each adjustment mechanism includes a control rod extending from the each cam. The control rod for each adjustment mechanism is pivotally connected to the cam of the respective adjustment mechanism at a control connection point which is offset from the pivot axis of the cam, whereby movement of the control rod rotates the cam about the pivot axis. The control rod includes a finger sized to engage a selected one of the adjustment position openings.

In one embodiment of this aspect, the two control rods are connected, such that, in combination, they define a single control rod. In this embodiment, operation of one adjustment mechanism operates the other adjustment mechanisms.

In another embodiment of this aspect, the control rods for the two adjustment mechanisms are independent of each other, such that the two adjustment mechanisms are operable independently of each other. In this embodiment, the adjustment mechanisms each comprise a means for maintaining an angular orientation of the control bar relative to the hopper wall (which orientation may change based on the rotational position of the controlled cam). In accordance with one variation of this embodiment, the means comprises a guide along which the control bar travels. The guide can define a passage, in the form of a slot in the hopper wall through which at least a part of the control rod slides. The slot can be straight or curved. Alternatively, the guide can circumferentially surround the control rod, in which case the guide would be a bushing, tube, or the like which is mounted to the hopper wall. Preferably, the bushing, tube or the like is pivotally mounted to the hopper wall. In another variation of this embodiment, the means comprises a controlled cam rotatably mounted to the hopper wall spaced from the control cam. In this variation, the control bar is operatively and rotatably connected to the controlled cam (i.e., the control bar extends between the controlled cam and the control cam for each adjustment mechanism).

In accordance with another aspect, the finger is urged into engagement with the control cam to maintain engagement of the finger with the control cam. This finger can be urged into engagement with the control cam by the control arm and/or a spring element. The control rod can exert a torsional force (due to slight twisting of the control arm along its length) and/or a bending force (due to the inherent spring force in the material of the control arm) activated when the finger is disengaged from the control cam. The spring member can extend between the control arm and the control cam. In addition, the weight of the control rod and/or a frictional fit between the finger and the control cam can be used to maintain the finger in engagement with the control cam. Finally, these "maintaining means" can be used in any combination or individually.

In accordance with another aspect of the adjustment mechanism, the position of the cams on the hopper wall can be fine-tuned or calibrated. To this end, the hopper wall includes a generally vertically oriented elongate slot. The first and second cams are each rotatable about an axle assembly which includes an axle member extending from the hopper wall through the hopper wall slot and a tightener proximate a free end of the axle member. The tightener is movable between a first position in which the axle assembly is movable along the slot a second position in which the axle assembly is positionally fixed relative to the slot. Illustratively, the axle member comprises a threaded shaft, and the tightener comprises a nut threadedly received on the threaded shaft. The axle assembly can include a spacer which spaces the cam a determined distance from the hopper wall.

BRIEF DESCRIPTION OF THE SEVERAL VIEWS OF THE DRAWINGS

FIG. 6 is a perspective vertical cross-sectional view taken approximately at line B-B of FIG. 1;

FIG. 7 is a perspective vertical cross-sectional view taken approximately at line A-A of FIG. 1;

FIG. 14 is a perspective view of a second embodiment of the feeder wherein the feeder includes two control cams; the feeder being shown with an end wall and a hopper wall removed to better illustrate the features of the second embodiment;

FIG. 15 is a perspective cross-sectional view of the feeder of FIG. 14 with the second hopper wall in place;

FIG. 20 is a perspective view of the feeder showing a further variation of the individual adjustment mechanism.

Corresponding reference numerals will be used throughout the several figures of the drawings.

DETAILED DESCRIPTION OF THE INVENTION

Figure 1:
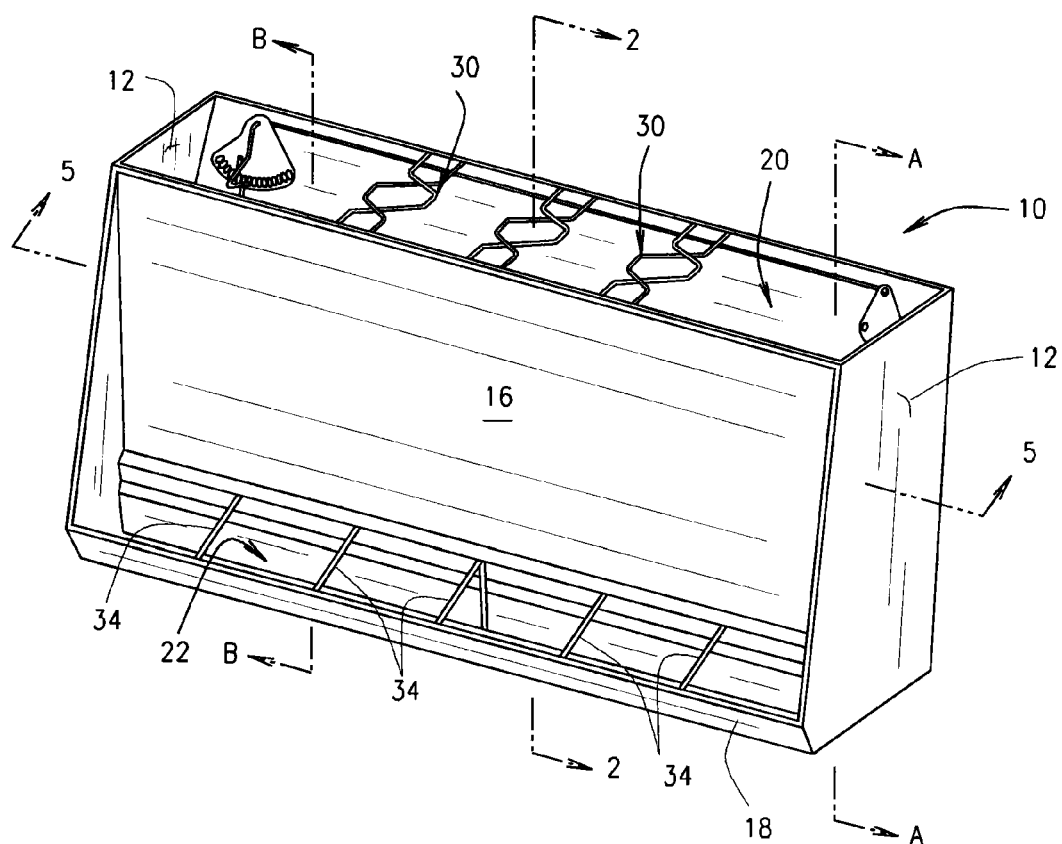
FIG. 1 is a perspective view of a first illustrative embodiment of an animal feeder.

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what we presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Figure 3:
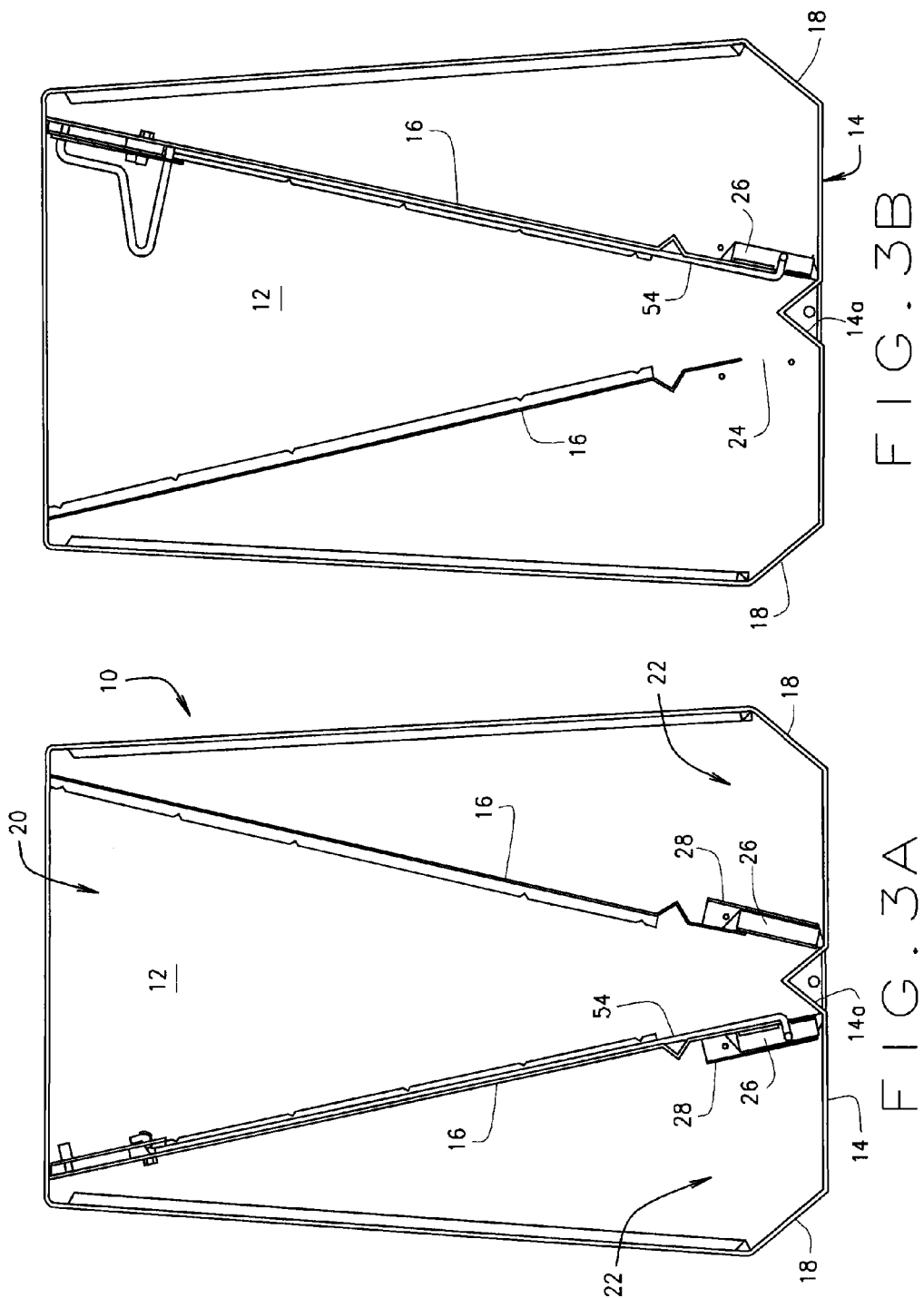
FIGS. 3a and 3b are vertical cross-sectional views taken along lines A-A and B-B of FIG. 1.
Figure 4:
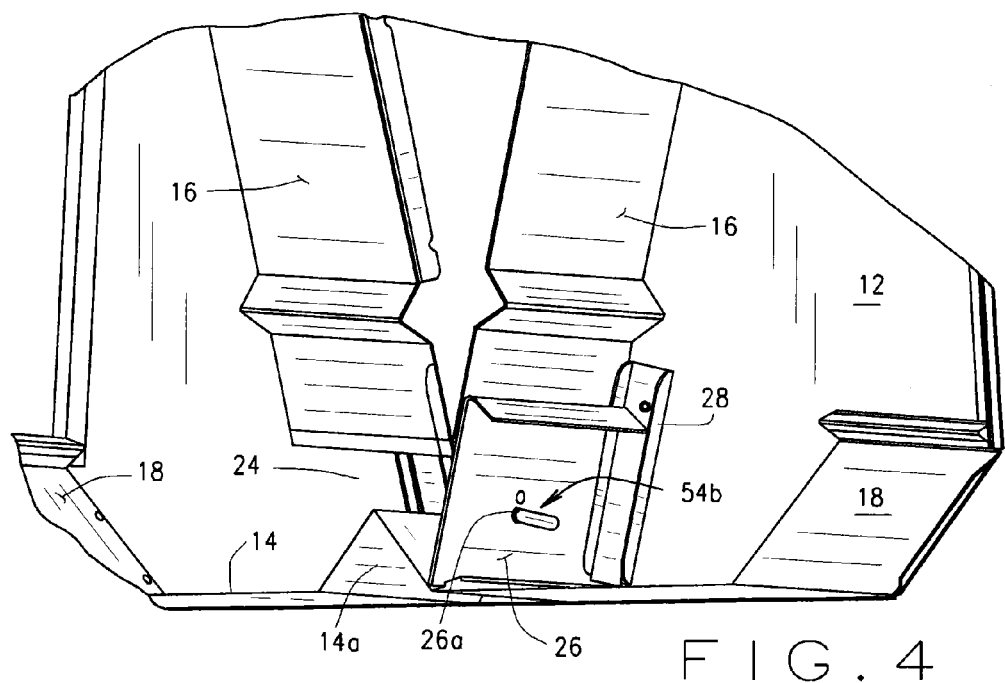
FIG. 4 is an enlarged fragmentary cross-sectional view showing a hopper wall and associated gate on a right side of the drawing, and a hopper wall with the associated gate removed on the left side of the drawing for purposes of illustration.

A feeder 10 includes two opposed end walls 12, a bottom surface 14, two hopper walls 16 and two trough walls 18. The two hopper walls 16, as can be seen, are sloped inwardly such that they are closer at their bottoms than at their tops. In combination with the bottom surface 14, the hopper walls 16 define a hopper 20. The two trough walls 18 also are sloped, but are much shorter than the inner surfaces 16. The trough walls 18, in combination with the hopper walls 16 and the bottom surface 14, define troughs 22. As can be seen in FIGS. 3b and 4, the bottom of the hopper walls 16 are spaced from the bottom surface 14 to define an opening 24 below each hopper wall 16 which places the hopper 20 in communication with the two troughs 22. At least one generally vertically adjustable gate 26 is provided to close the opening 24. As will be discussed in more detail below, the gate 26, which is movable along a plane defined by the hopper wall 16, can be raised and lowered to adjust the size of the openings 24, and to thus alter the depth to which the troughs 22 can be filled. As best seen in FIG. 4, the gate 26 slides in a channel member 28 which is mounted to the end wall 12. The opening 24, and hence the gate 26, extend the full length of the hopper and trough (from end wall to end wall). There is a channel member 28 mounted to each end wall 12. As noted, the gate moves in a plane parallel to the plane of the hopper wall 16, and thus, the gate 26 is sloped as well. The channel 28, therefore, is similarly sloped.

Figure 2:
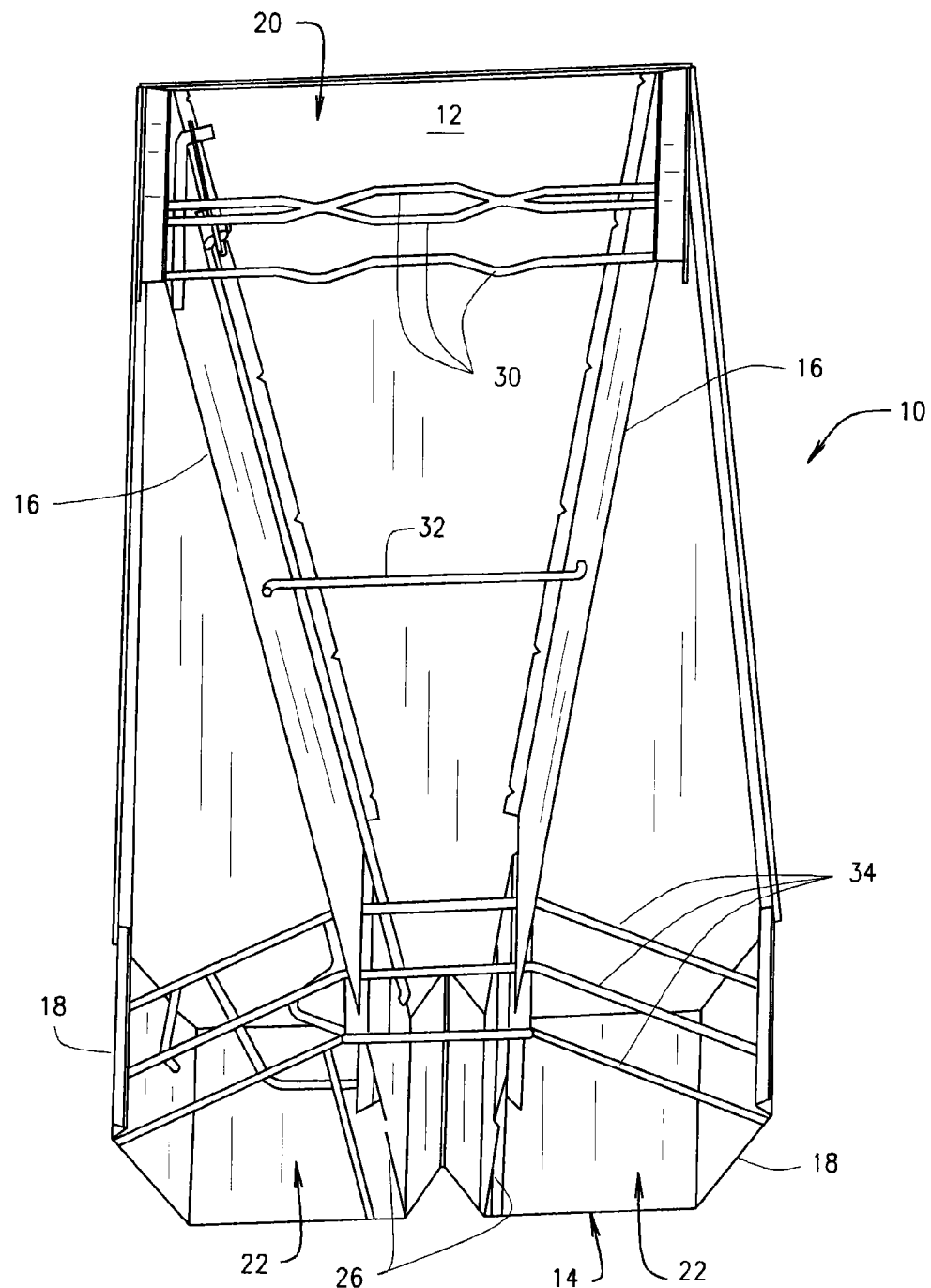
FIG. 2 is a vertical cross-sectional view taken along line 2-2 of FIG. 1.

As best seen in FIG. 2, the trough walls 18 are formed integrally with the bottom 14. Further, the bottom 14 includes a central portion 14a (FIG. 3a) which defines a triangle that has a base that is the width of the hopper 20 at the bottom of the hopper. This triangular portion 14a will help direct feed in the hopper through one of the openings 24 and into the troughs 22. Additionally, the feeder includes upper transverse rods 30 and mid-level transverse rods 32 (FIG. 2) which extend between the two hopper walls 16 of the hopper, and help reinforce the hopper against the forces placed on the hopper when the hopper is filled with feed. The mid-level transverse rods 32 are generally straight. However, as seen in FIGS. 1 and 2, the upper transverse rods 30 are bent, such that two adjacent rods 30 define a hexagon between the hopper walls 16. The upper transverse rods 30 additionally help position feed tubes (not shown) which supply feed to the feeder 10. Lastly, there are a plurality of lower transverse rods 34 which extend from one trough wall 18, through the adjacent hopper wall 16, through the hopper, through the opposite hopper wall 16, and then to the opposite trough wall 18. The rods 34 provide structural rigidity to the feeder 10, as do the rods 30 and 32. The rods 34 further subdivide the troughs 22 into discrete sections and define separate "feeding areas" for the hogs or other animals that are served by the feeder 10.

Figure 5:
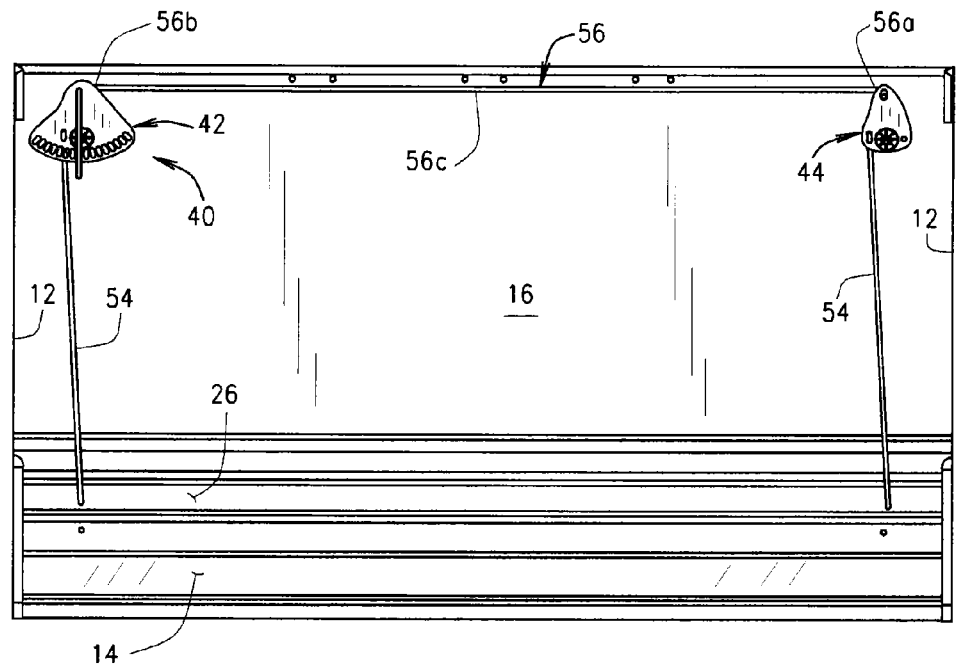
FIG. 5 is a vertical cross-sectional view taken along line 5-5 of FIG. 1 (and which is perpendicular to the cross-sectional view of FIGS. 2, 3a and 3b) and which shows an adjustment mechanism of the feeder.

Turning to FIG. 5, the feeder 10 is provided with an adjustment mechanism 40 for each gate 26 in the feeder to raise or lower the gate (as desired) to a desired location, to adjust the size of the opening 24. The adjustment mechanism 40 includes a control cam 42 and a controlled cam 44 positioned at opposite ends of the wall 16 spaced slightly below the top of the wall. The two cams 42 and 44 are mounted for rotation about axles 46 and 48, respectively, and are spaced from the wall 16 by a spacer 50 and 52, respectively. (FIGS. 10, 11a) The axles 46 and 48 can comprise pins which extend from the hopper wall 16 or bolts which extend through the hopper wall 16. In either event, the cams 42 and 44 are prevented from coming off their respective axles by, for example, nuts, lock washers, c-clips or the like. The axles 44 and 46 are off-center with respect to both cams. The axles 44 and 46 are horizontally aligned with each other. That is, each axle is spaced below the top of the wall 16 by the same distance.

Figure 8:
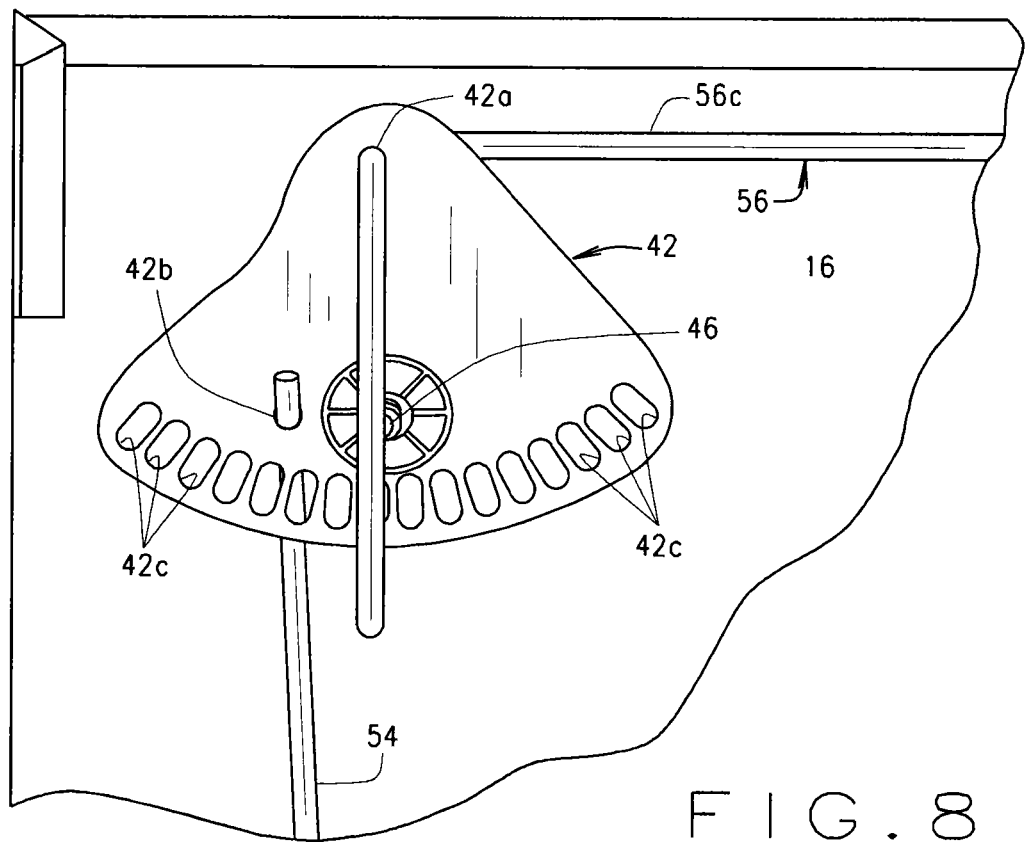
FIG. 8 is an enlarged fragmentary plan view of a hopper wall showing a control cam of an adjustment mechanism of the feeder.
Figure 9:
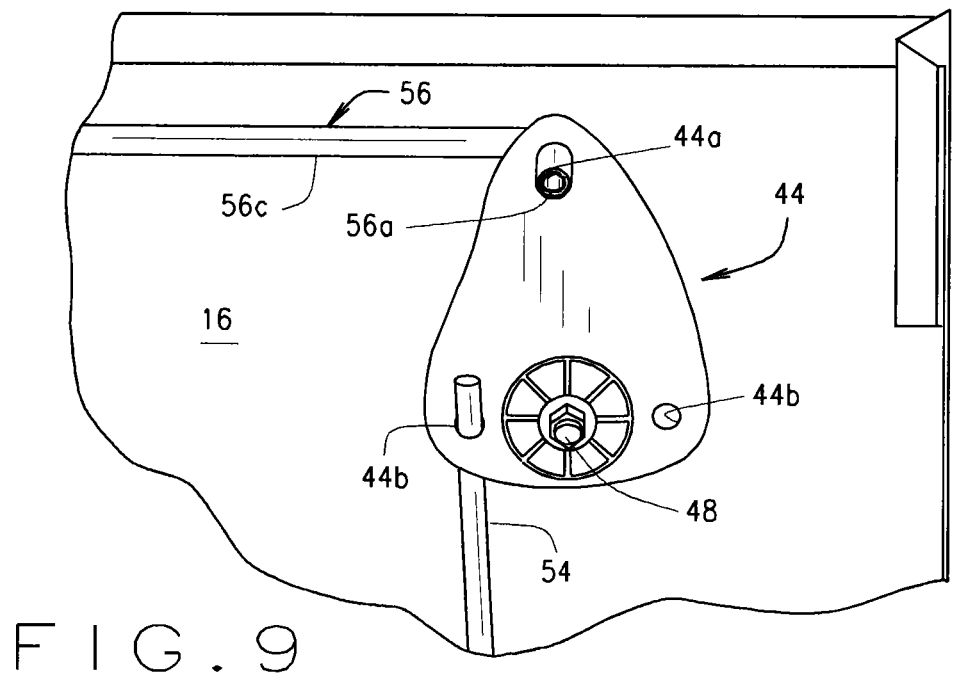
FIG. 9 is an enlarged fragmentary plan view of the hopper wall showing a controlled cam of the adjustment mechanism.

Each cam 42 and 44 has an upper opening 42a, 44a at upper portions thereof, and above their respective axles. (FIGS. 8 and 9) The control cam 42 includes an opening 42b spaced from the axle 46, and a plurality of position adjusting openings 42c. The position adjusting openings 42c are elongate (i.e., generally oval), and are formed on an arc. The controlled cam 44 has two openings 44b positioned on opposite sides of the axle 48. The two openings 44b are equidistant from the axle 48.

The openings 42b and 44b are shown to be generally level with the respective axles 46 and 48, when the cams 42 and 44 are generally vertically oriented. However, the openings 42b and 44b of the cams 42 and 44, respectively, could be placed below or above the axle if desired. As will become apparent below, what is important is that the openings 42b and 44b move vertically as the cams 42 and 44 are rotated about their respective axles.

Figure 10:
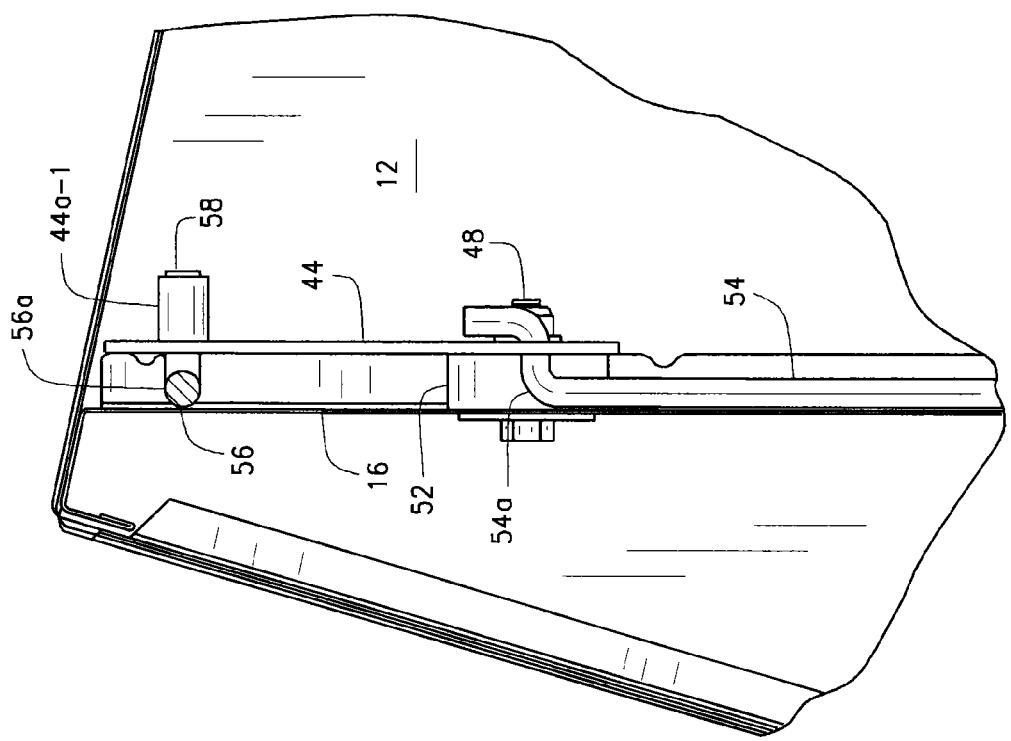
FIG. 10 is an enlarged cross-sectional view showing the mounting of the controlled cam to the hopper wall.

A link 54 extends between each of the cams 42 and 44 and the gate 26. As seen in FIG. 10, at their upper ends 54a, the links 54 are positioned between the cams 42,44 and the wall 16. Each link 54 is bent, such that a portion of the link extends away from the wall 16 and through the respective opening 42b, 44b of the cams 42 and 44. The links 54 then bend again to prevent the links from disengaging the cams. These bends give the links a generally ⌐-shape at their top ends 54a. The links 54 are similarly bent at their bottom ends 54b (FIGS. 4 and 7) where the links pass through an opening 26a in the gate 26. The links 54 thus connect the cams 42 and 44 with the gate 26, at opposite ends of the gate. The connections of the links 54 to the cams 42 and 44 are spaced or offset from the axle 46, 48 for the cam 42, 44. Hence, as the cams are rotated, the vertical position of the links 54 will change, thereby adjusting the vertical position of the gate 26 (and hence, the size of the opening 24 between the hopper 20 and the trough 22.

The adjustment mechanism also includes a control arm 56 (FIG. 5) which extends horizontally between and operatively connects the control cam 42 and the controlled cam 44. The control arm 56 comprises ends 56a and 56b, with a center section 56c between its ends. The control arm central section 56c is generally adjacent the wall 16, such that the ends 56a and 56b are initially between the wall 16 and the cams 42, 44. At its end 56a, the control arm 56 is bent to define a finger 58 (FIG. 10) which extends forwardly through the opening 44a of the controlled cam 44. The opening 44a is defined by a cylindrical tube or sleeve 44a-1. This sleeve is sized to frictionally grasp the finger 58 of the control arm 56 to substantially prevent translational movement of the finger 58 relative to the cam 44, but yet allow rotational movement of the finger 58 relative to the cam 44.

Figure 11A:
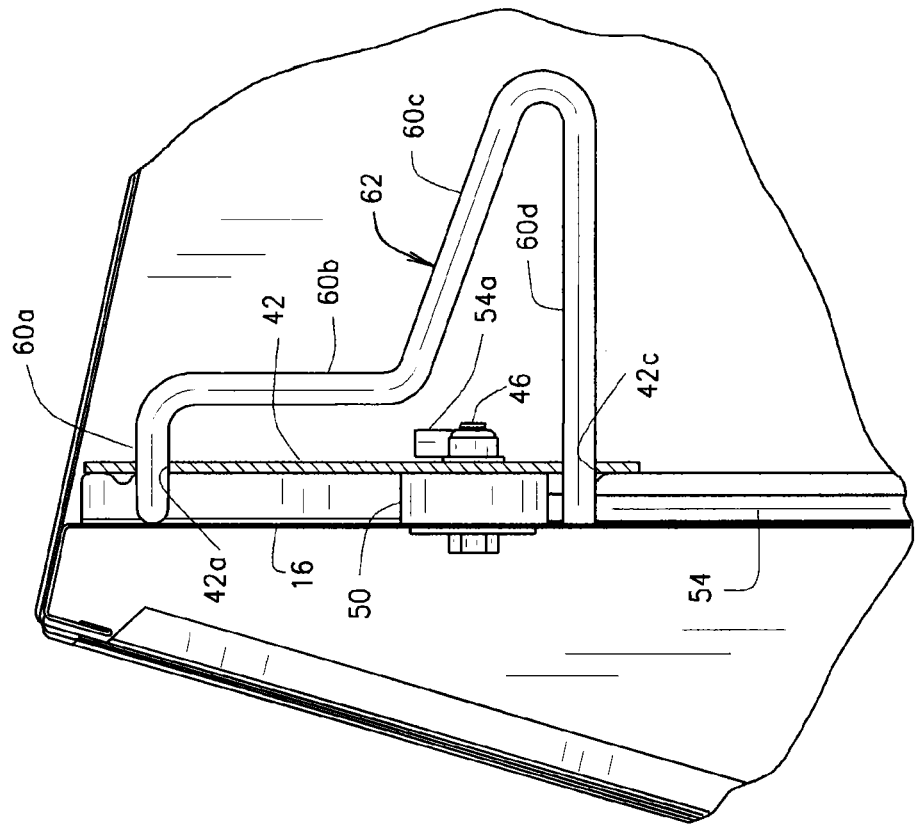
FIGS. 11a and 11b are enlarged cross-sectional views showing the mounting of the control cam to the hopper wall, the views being taken from opposite sides of the control cam.
Figure 11B:
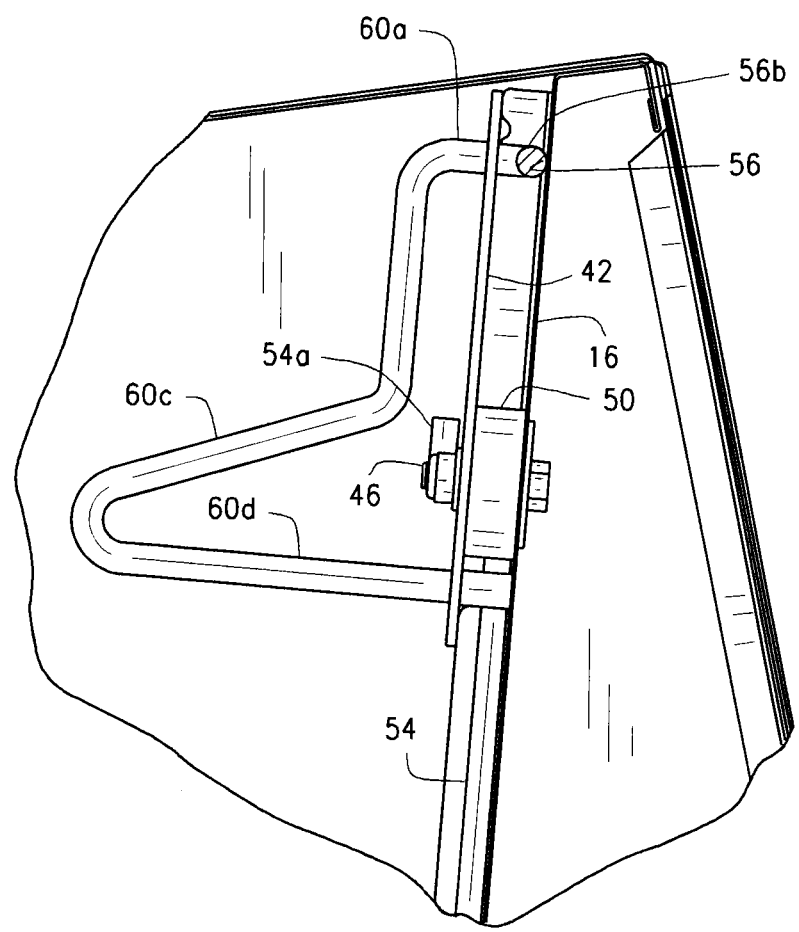

At the opposite end 56b, the control arm 56 is bent, as shown in FIGS. 11 a,b, to form a forwardly extending portion 60a which extends through the upper opening 42a of the control cam 42. The control arm 56 then includes a downwardly extending portion 60b, which extends generally parallel to the control cam 42 downwardly to a point slightly above the axle 46. The control arm is then bent outwardly to form a downwardly and outwardly sloping portion 60c. (FIGS. 11a,b). At the end of the portion 60c, the control arm is bent to form a portion 60d which extends back toward the control cam 42. The portions 60b and 60c are sized, and the bends are shaped, such that the portion 60d is generally aligned with the lower most adjustment opening 42c of the control cam 42. The portion 60d is sized such that the end of the control rod extends through a selected one of the adjustment openings 42c of the control cam 42. The openings 42a and 42c of the control cam 42 are sized to allow translational motion of the control arm 56 relative to the control cam 42. The potions 60c and 60d effectively form a handle 62 for the control arm which can be grasped to adjust the position of the gate 26, as discussed below. If desired, a second handle could be formed proximate the controlled cam to facilitate operation of the adjustment mechanism 40 from either side of the feeder.

Figure 13:
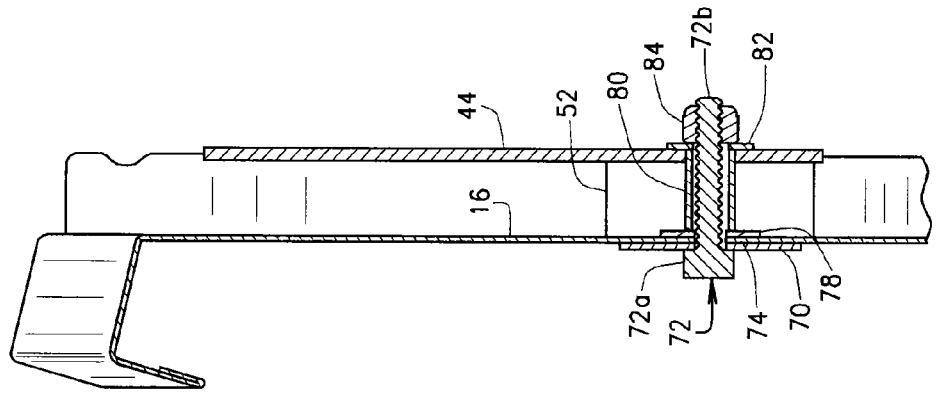
FIG. 13 is a vertical cross-sectional view taken through the axle assembly of the controlled cam.
Figure 12:
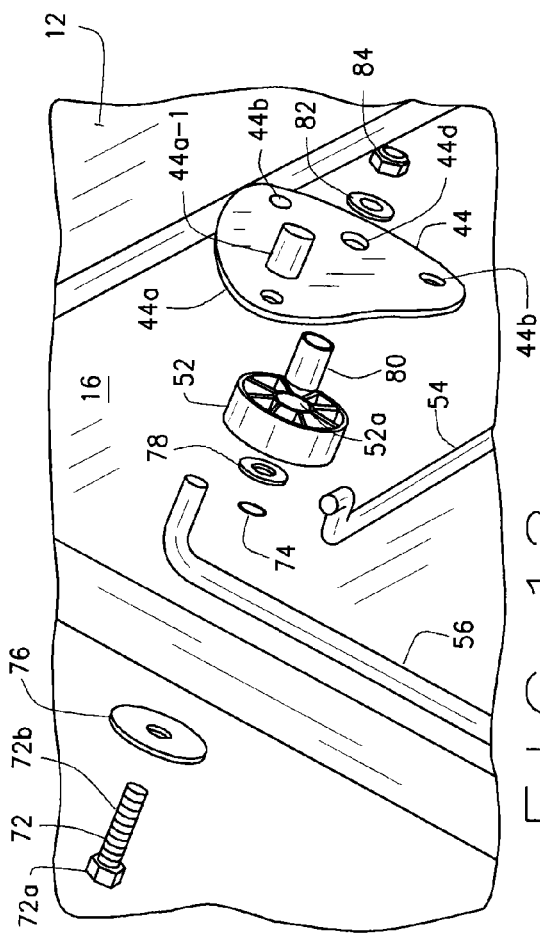
FIG. 12 is an exploded view of the axle assembly and mounting of a cam to a hopper wall.
Figure 12A:
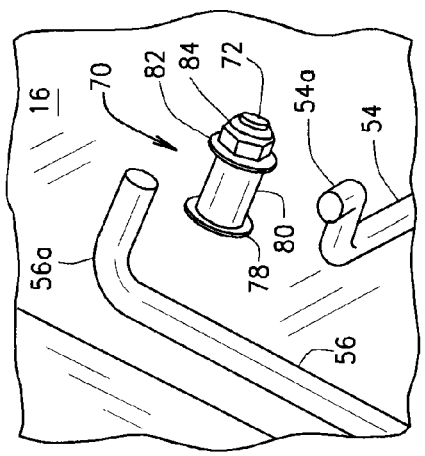
FIG. 12a is a perspective view of an axle assembly mounted to a hopper wall with the cam and spacer removed for purposes of illustration.

Turning to FIGS. 12-13, the axles 46 and 48 for the cams 42 and 44 comprise axle assemblies 70. The two axle assemblies 70 are identical, and hence the axle assembly 70 for the controlled cam 44 is shown. The axle assembly 70 comprises a bolt 72 which passes through a generally vertically oriented elongate slot 74. An outer washer 76 is positioned on the bolt to be between the bolt head 72a and the outer surface of the hopper wall 16. If the bolt head 72a were sufficiently large, the outer washer 76 may not be needed. The bolt 72 can be replaced with a pin or rod which extends inwardly from the inner surface of the hopper wall 16. A first inner washer 78, a sleeve 80 and a second inner washer 82 are received on the bolt shaft 72b and held in place on the bolt shaft by means of a nut 84. The nut 84 is shown to be a lock nut. The spacer 52 and cam 44 are positioned on the sleeve 80. The cam 44 includes an axle opening 44d sized to slide over the sleeve. The spacer 52 includes a similarly sized central opening 52a. The axle opening 44d is sized to allow the cam 44 to rotate about the sleeve 80. The inner washers 78 and 82 are larger in diameter than the openings 44d and 52a of the cam 44 and spacer 52. Hence, the spacer and cam are positioned on the sleeve prior to the second inner washer 82 and nut 84 being positioned on the bolt shaft 72b. As can be appreciated, when the nut 84 is tightened onto the bolt 72, the hopper wall 16 is clamped between the outer washer 76 (or bolt head 72a) and the first inner washer 78; and the sleeve 80 is clamped between the first inner washer 78 and the second inner washer 82. The sleeve 80 is sufficiently long such that the cam and/or spacer can rotate fairly easily about the sleeve. That is, the clamping force generated when the nut 84 is tightened will not prevent the cam and/or spacer from rotating, and hence, will not prevent adjustment of the gate height. The nut 84 could be replaced with a pin (such as a cotter pin), a toggle lever, or any other desired mechanism to prevent the cam, spacer, sleeve, etc. from coming off the shaft 72b. However, it is preferable that this mechanism be able to provide an effective "clamping" force against the cam, spacer, sleeve, etc. so that the vertical position of the axle assembly can be fine-tuned or adjusted as may be necessary.

When the feeder 10 is assembled, and the adjustment mechanism is first installed, the axle assemblies 70 in combination with the elongate slots 74 in the hopper wall allow for calibration of the vertical position of the adjustment mechanism 40. To calibrate the adjustment mechanism, the bolt 84 is loosened (or is not initially fully tightened) so that the axle assembly 70 can slide in the elongate opening 74 in the hopper wall 16. With the axle assembly loose, the gate 26 is positioned such that the opening 24 between the hopper and trough is at its calibration height. In this position, the control cam 42 is rotated to the position indicative of that calibration height, i.e., rotated such that the control arm portion 60d is received in the corresponding position adjusting opening 42c (with reference to FIG. 8). With the adjustment mechanism so positioned, the nuts 84 on each of the axle assemblies 70 are tightened down to securely position the axle assemblies at a relative position along the elongate opening 74. This ability to calibrate the position of the adjustment mechanism allows for the feeder to account for slight variances in the production of the various elements of the feeder due to normal manufacturing procedures. Hence, by calibrating the adjustment mechanism 40, the position of the gate can be accurately adjusted, and the effective size of the opening 24 from the hopper 20 to the trough 22 can be more easily and precisely controlled.

In operation, with the control arm 56 engaged with the control cam 42, as shown in the drawings, a user grasps the control arm handle 62 and pulls the handle away from the wall 16, such that the portion 60d of the control arm disengages the control cam 42. With the portion 60d disengaged from the control cam 42, the control arm can be translated horizontally (either to the left or the right). As noted above, the control arm is connected to the cams 42 and 44 above the axles 46 and 48. Hence, horizontal translation of the control arm will cause the cams to rotate or pivot about their respective axles 46, 48. The sleeve 44a-1 on the controlled cam 44 reduces twisting of the control rod along its axis. Further, as can be appreciated, horizontal movement of the control arm 56 will cause the two cams to pivot simultaneously about their respective axles. As the cams are pivoted, the vertical position of the links 54 will be altered, as noted above, to thereby raise or lower the gate 26. When the gate 26 is at a desired position, the control arm handle 62 can be pushed towards the control cam 42 so that the portion 60d of the control arm 56 engages the adjustment opening 42c that has come into alignment with the control arm portion 60d due to the rotation of the control cam 42. As noted above, the adjustment openings 42c are formed on an arc. The arc has a radius, and the adjustment openings 42c are sized, such that as the control cam 42 is pivoted, each of the openings will come into alignment with the portion 60d of the control arm 56.

When hogs or other animals feed at the trough, they can apply vibrations to the feeder 10. It is thus desirable that the feeder incorporate a securing means which will substantially prevent the portion 60d of the control arm 56 from disengaging the control cam. As can be appreciated, if the control arm 56 did inadvertently become disengaged from the control cam 42, the weight of the gate 26 (either by itself or in conjunction with vibrations induced by the feeding animals) could cause the gate 26 to drop, thereby reducing the effective size of, or even closing, the opening 24 between the hopper 20 and trough 22. This securing means can take several forms. When the handle 62 is pulled outwardly, to disengage the control arm 56 from the control cam 42, the control rod flexes slightly at the junction between sections 60a and 60b of the control arm 56. This flexing or bending motion creates a spring or biasing action (i.e., a bending force) in the arm which will urge the finger into engagement with the selected adjustment opening to help maintain the arm section 60d in the opening 42c of the control cam 42. This spring action of the control arm 56 could be enhanced by the use of a spacer sleeve or bushing, which would space the vertical portion 60b further from the control cam 42. Further, some twist or torsion is induced in the control rod 56 when the handle is pulled outwardly. This twist or torsion will also help maintain the control arm portion 60d in the control cam 42. If desired, the natural biasing force of the control arm itself can be augmented, for example, with a spring that could extend between the handle 62 and the control cam to pull the handle 62 toward the controlled cam. Further, the weight of the control arm itself can generate a "weight force" which will help maintain the finger in engagement with the control cam adjustment opening. Additionally, the slot 42c of the control cam could be sized relative to the diameter of the control arm 56 to create a friction fit between the control arm 56 and the slot 42c of the control cam. This friction fit could be reinforced, for example, by providing a slightly enlarged end to the control arm portion 60d which would form a snap-type fit between the arm portion 60d and the control cam 42. Alternatively, the control cam slot 42c could be provided with an enlarged upper portion through which this enlarged end portion of the control arm could slide. The arm would then drop down relative to the slot 42c to a narrower portion of the slot through which the enlarged portion could not fit. In this alternative, the control cam would have a bayonet-type slot which receives the control arm portion 60d.

Figure 16:
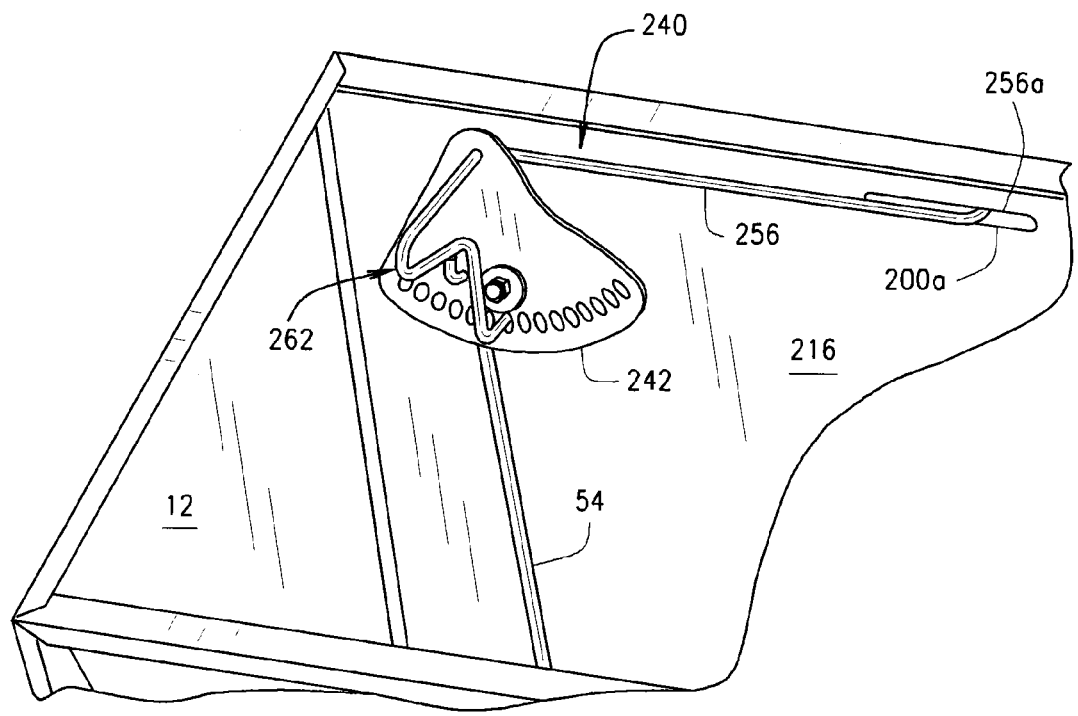
FIG. 16 is perspective fragmentary view of a feeder with an individual adjustment mechanism, wherein two independent and separate adjustment mechanisms are used to adjust the height of the gate from opposite ends of the gate.

A second embodiment of the feeder is shown in FIGS. 14-16. In these figures, the feeder 110 is substantially similar to the feeder 10. To this end, the feeder 110 includes opposed sloped hopper walls 116, end walls 112, bottom 114, and trough walls 118. As with the feeder 10, the hopper walls 116, end walls 112 and bottom 114 define a hopper 120; and the hopper walls 116, bottom 118, trough walls 118 and end walls 112 define troughs 122. The hopper walls 116 do not extend all the way to the bottom of the feeder, and thus define an opening 124 between the hopper 120 and the trough 122. A movable gate 124 is provided to open and close the opening 124. An adjustment mechanism 140 is provided to adjust the position of the gate 126, and thus the size of the opening 124 between the hopper 120 and the trough 122.

The adjustment mechanism 140 is substantially similar to the adjustment mechanism 40 of the feeder 10. The difference between the two adjustment mechanisms is that the adjustment mechanism 140 includes two control cams 142a and 142b, instead of one control cam and one controlled cam. Stated differently, the controlled cam 44 of the feeder 10 is replaced with the second control cam 142b. The control cams 142a,b are positioned at opposite ends of the hopper wall 116 and are mounted to the hopper wall slightly below the top of the hopper wall and slightly inset from the end walls 112. The control cams 142a,b are identical to each other, and are generally identical to the control cam 42 (FIGS. 9, 11a, 11b) and will thus not be described in detail herein. Although there is a slight difference in appearance between the cams 142a,b and the cam 42, this slight change does not affect the function of the cams relative to each other. As with the adjustment mechanism 40, the adjustment mechanism 140 includes a link 154 which extends between each of the cams 142a,b and the gate 126, to operatively connect the cams and the gate.

In view of the use of two control cams, the control arm 156 has been modified slightly relative to the control arm 56. The control arm 156 has opposed ends which are identical to each other. As seen in FIG. 15, the mid-section of the control arm 156 is spaced forwardly of a plane defined by a front surface of the cams 142a,b. The ends 160 of the control arm 156 thus include a leg 160a which extends rearwardly to a point between the hopper wall 116 and the rear surface of the cam 142a,b. A second leg 160b extends behind the cam 142a,b. A third leg 160c extends forwardly from the end of the second leg 160b and extends through an upper opening in the cam 142a,b. From this third leg 160c, a forth leg 160d extends downwardly vertically in front of the cam 142a,b. The leg 160d ends in a rearwardly facing finger 160e which extends into a determined or selected positioning slot of the control cam 142a,b. The vertically extending leg 160d of the control arm end 160 defines a handle 162, which operates substantially in the same manner as the handle 62 of the control arm 56. The handle 162 could be shaped similarly to the handle 62; or, alternatively, the handle 62 could be shaped similarly to the handle 162.

The adjustment mechanism 40 can only be operated from one end of the feeder (i.e., the end with the control cam 42 and the handle 62). However, because the feeder 110 includes a control cam 142 at each end of the feeder, and the control arm 156 has a handle 162 associated with each cam 142a,b, the adjustment mechanism 140 can be operated from either end of the feeder. As can be appreciated, when the handle 160 associated, for example, with the control cam 142a pivoted to disengage the finger 160e from the cam 142a, the handle 160 adjacent the cam 142b will also be pivoted to disengage its finger from the cam 142b. To accomplish this, the control arm 156 must be made from a material sufficiently rigid or stiff such that pivoting of one handle will pivot both handles, so that when one handle is disengaged from its associated cam, the other handle will also be disengaged from its associated cam. Similarly, the fingers 160e of the handles 160 and the adjustment slots of the cams 142a,b must be sized such that when one handle is pivoted back into engagement with its associated cam, the opposite handle will also engage its associated cam. It will be appreciated, that the two control cams will need to be synced, such that the control arm finger will engage corresponding adjustment slots in the two cams. Syncing the control cams can be accomplished, for example, by initially placing the fingers at the opposite ends of the control rod in the adjustment opening farthest to the left in each control cam. Syncing of the two cams can be performed either before or after calibration of the position of the cams (as described above).

As can be seen, the feeders 10, 110 allow for fairly easy control of the size of the openings 24, 124 between the hopper 20, 120 and the troughs 22, 122. The adjustment mechanisms 40, 140 allow for adjustment of the position of the gates 26, 126 across their full length with a single adjustment or operation. Further, this adjustment could be made one-handed.

The feeders 10 and 110 enable adjustment of the height of the gate from one side of the feeder. That is, operation of the adjustment mechanism 40 of the feeder 10 or operation of one of the adjustment mechanisms 140 of the feeder 110 adjusts the gate. There may be situations in which it is desirable to adjust the height of the opposite ends of the gate individually. In such a situation, an individual adjustment mechanism would be needed at each end of the gate, and these individual adjustment mechanisms would not be connected together. Thus, for example, the feeder 110 could be altered to allow for individual adjustment of the opposite ends of the gate by removing the central portion of the control bar 156, such that each control cam effectively has its own control bar. Thus, the control bar would extend away from the control cam generally parallel to the hopper wall 116.

Figure 17:
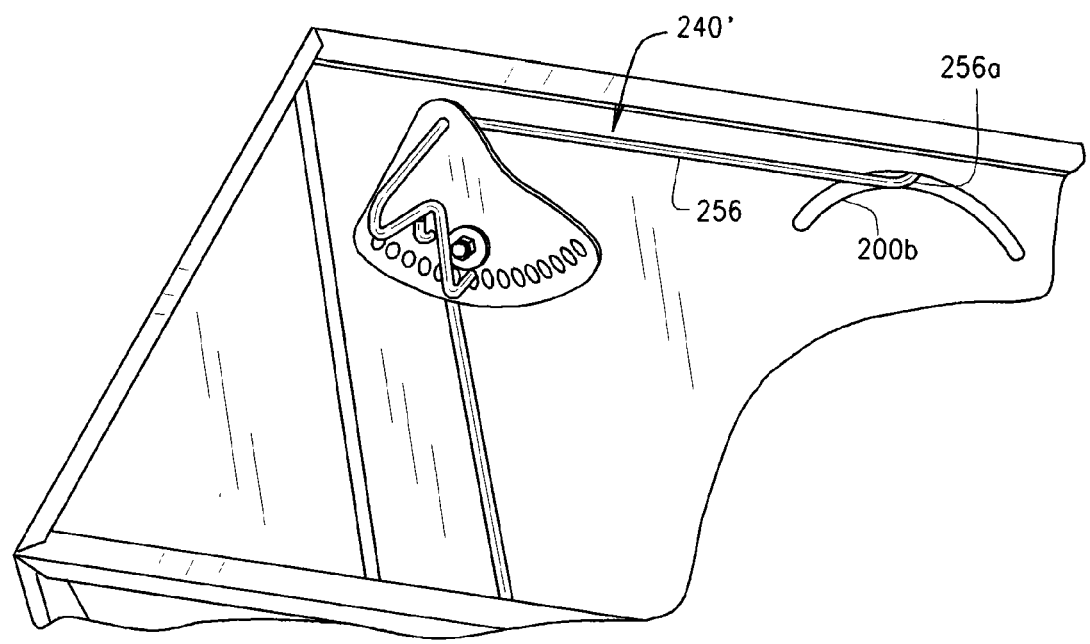
FIG. 17 is a view similar to FIG. 16, but with a variation on the individual adjustment mechanism.
Figure 18:
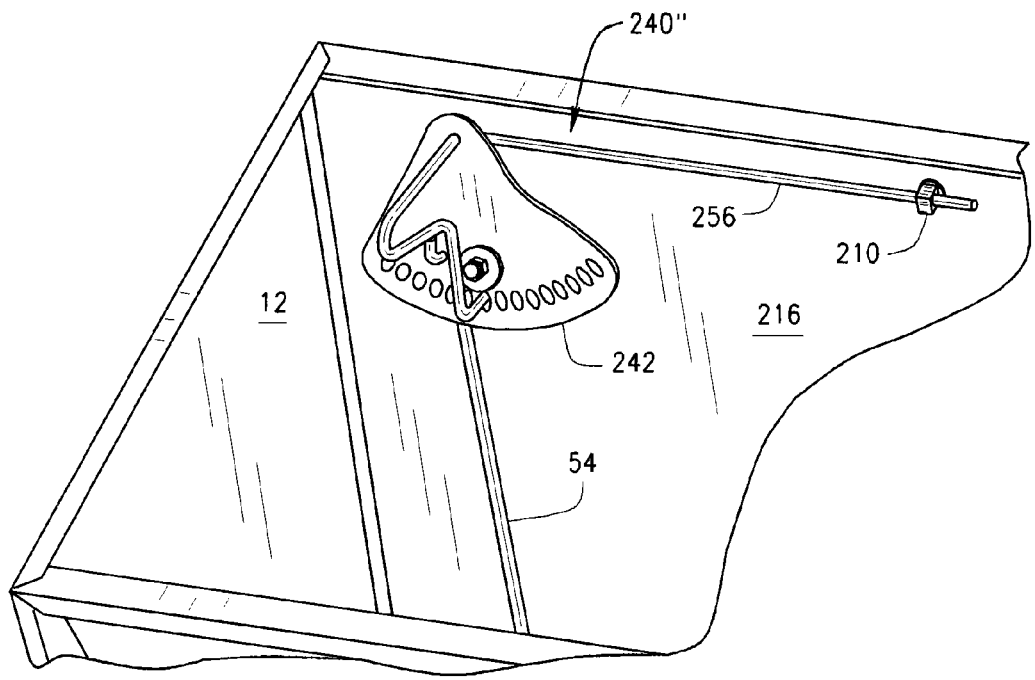
FIG. 18 is a view similar to FIG. 16, but showing a further variation of the individual adjustment mechanism.
Figure 19:
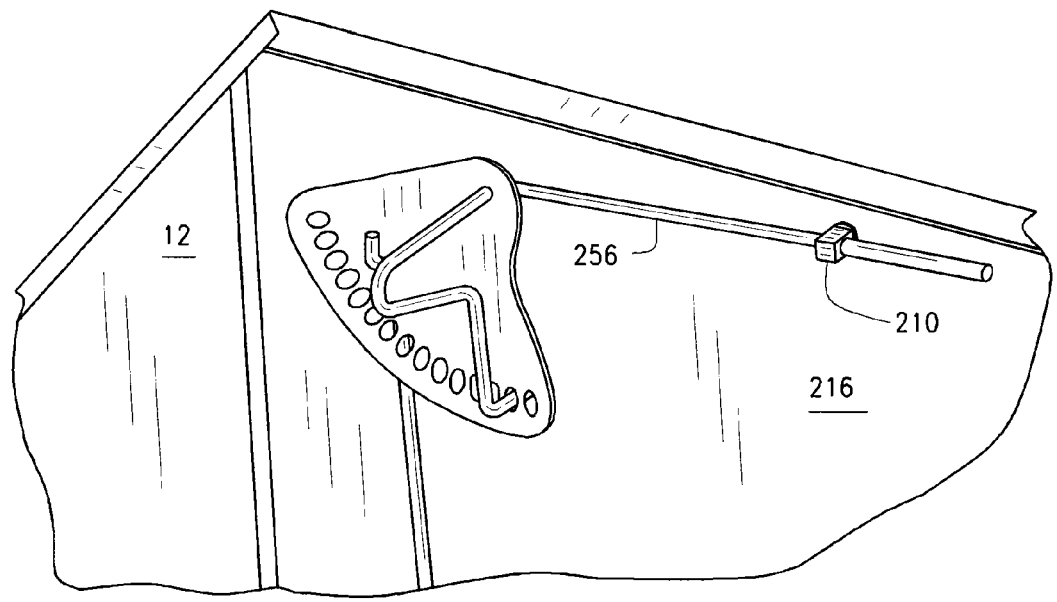
FIG. 19 is a view of the adjustment mechanism of FIG. 18, when the control cam is rotated about its pivot axis.

In order for individual adjustment mechanism to work properly, the control bar for each adjustment mechanism must maintain its angular orientation set when the pivotal position of the control cam is selected. Hence, the angular position or orientation of the control bar may change based on the rotational position of the control cam. In the drawings, the control bar is shown to have a generally horizontal orientation. Depending on the shape of the control cam, and the point at which the control bar is connected to the control cam, the control bar could have an orientation other than a generally horizontal orientation. The orientation of the control bar can be maintained in several different ways. To maintain the orientation of the control bar, the control bar could be received, for example, in a guide on the hopper wall. This guide could be in the form of a groove, channel or slot formed on the wall. FIG. 16 shows an individual adjustment mechanism 240 wherein the guide is in the form of a passage which is defined by a generally straight slot 200a which is generally parallel to the top edge of the hopper wall. FIG. 17 shows an individual adjustment mechanism 240' wherein the guide is in the form of a curved or arced slot 200b. In the embodiments of FIGS. 16 and 17, the control rod 256 includes a finger 256a at its free end which slides, rides or travels along the slot. FIGS. 18 and 19 show an individual adjustment mechanism 240" wherein the passage of the guide is a circumferentially surrounds the control rod. In this instance, the passage is defined by a tube, such as a bushing 210 which is secured to the wall and through which the control bar passes. The bushing is sized such that the control bar can slide relative to the bushing. As the control cam 242 rotates, the connection point of the control rod 256 to the control cam will move in a vertical arc. This is shown, for example, in FIG. 19, wherein the control cam is rotated relative to the position of the control cam in FIG. 18. In FIG. 19, the connection point of the control rod to the control cam is lower, relative to the top edge of the hopper wall, than the connection point of the control rod to the control cam in FIG. 18. To facilitate this movement of the connection point, the bushing 210 is preferably mounted to the hopper wall 216 in a manner which will allow it to rotate in a plane generally parallel to the plane of the hopper wall. In a variation on the concept of a slot or bushing, the guide could be defined by an elongate tube mounted to the hopper wall through which the control rod slides. Such a tube could fully encircle the control rod or could be slit to define an elongate slot in the tube. Such a slot in the tube would be narrower than the widest dimension of the control rod to prevent the control rod from coming out of this tube. With a slit tube, the control rod could be snapped into the tube. Like the bushing 210, this tube could be pivotally or rotationally mounted to the hopper wall 216.

In another alternative of the individual adjustment mechanism 240", shown in FIG. 20, the control bar's orientation could be maintained by the use of a controlled cam 244, similar to the adjustment mechanism 40 of the feeder 10. In this variation, the control cam 242 on each side of the feeder will have an associated controlled cam 244 spaced a short distance from the control cam; and the control bar 256' would span the distance between the control cam and the controlled cam. However, unlike the adjustment mechanism 40 of the feeder 10, the controlled cam 244 in this instance would not need a link extending from the controlled cam to the gate.

In the drawings, the feeder 10 is shown with only a single adjustment mechanism 40. However, a feeder with two gates 26 (i.e., a gate on each hopper wall 16), would be provided with two adjustment mechanisms 40, one for each gate. Hence, the feeder 10 would be provided with an adjustment mechanism 40 on each hopper wall 16.

In the embodiments of FIGS. 16-20, it is noted that the handle 262 is modified slightly relative to the handle 62 (shown, for example, in FIG. 6). The handle 62 (FIG. 6) in essence is positioned at the bottom of the control cam 42. The control rod 256, however, is bent such that the handle 262 is in essence at the top of the control cam 242.

As various changes could be made in the above constructions without departing from the scope of the invention, it is intended that all matter contained in the above description or shown in the accompanying drawings shall be interpreted as illustrative and not in a limiting sense. Although the feeder has been described to include two troughs (and hence two gates and two adjustment mechanisms), it will be appreciated that a feeder can be provided with a single trough. Although the position adjusting openings of the control cam are shown to define an arc which is below the control cam's axle, the position adjusting openings could be positioned, for example, to be approximately 90° from the position shown, such that the arc is generally vertical, rather than horizontal. This would require that the handle portion of the control arm be shaped slightly differently. However, it has been found that if the position adjusting openings define a generally vertical arc, rather than a generally horizontal arc, as shown, the amount of travel of the gate increases. That is, a vertically oriented arc of position adjustment openings will raise or lower the gate more than a generally horizontally oriented arc of position adjustment openings for the same amount of rotation of the cam. Tightening mechanisms, other than a bolt and nut, can be used to fix the position of the axle assembly 70 along the axle slot 74 of the hopper wall. For example, a cam lever can be provided at the end of the bolt shaft, in which the toggle is movable between a loose position (in which the position of the axle assembly can be adjusted) and a tight position (in which the position of the axle assembly is fixed). Although the opening 24 is formed by having the hopper walls being shorter than the feeder end walls, such that there is a gap between the bottom of the hopper wall and the bottom of the feeder, the opening 24 could be formed in other ways. For example, the hopper walls could extend the full height of the feeder end walls and define one or more openings through which feed can pass. These examples are merely illustrative.

The invention claimed is:

1. An animal feeder comprising:
   a hopper defined by a bottom surface, opposed end walls, and opposed hopper walls;
   at least one trough defined by a bottom surface, opposed end walls, a trough wall, and a portion of at least one hopper wall; said trough being in communication with said hopper via an opening defined, at least in part, by said hopper wall;
   a gate sized to close the opening; said gate being movable to adjust the effective height of the opening; and
   an adjustment mechanism operable to adjust the vertical position of the gate (and hence the effective height of the opening); the adjustment mechanism comprising:
      a first cam and a second cam, each of said cams being rotatably mounted to said at least one hopper wall; the first and second cams being horizontally spaced apart from each other; said cams each being rotatable about a pivot axis;
      a first link extending between and connecting said first cam to said gate and a second link extending between and connecting said second cam to said gate; said first and second links being connected to said first and second cams, respectively, at a point on said cams spaced from said pivot points of said cams, such that rotation of said cams is translated to vertical motion of said links; and
      a control rod extending between said first and second cams; said control rod being rotationally connected to said cams at points on said cams such said cams can rotate relative to said control rod and such that movement of said control rod in a direction of an axis of the control rod induces rotation of said cams about their pivot axes;
      at least said first cam being a control cam, said control cam comprising two or more position adjusting openings spaced from the pivot axis for said control cam; said control rod comprising a finger sized to engage a selected one of said adjustment position openings.

2. The feeder of claim 1 wherein said control rod finger is biased into engagement with said control cam.

3. The feeder of claim 2 wherein said control rod applies a torsional force, a bending force, or a weight force to urge said finger into engagement with said control cam.

4. The feeder of claim 1 wherein said control rod finger is shaped relative to said adjustment position openings to physically and or frictionally maintain said finger in engagement with said control cam.

5. The feeder of claim 1 wherein said position adjusting openings are arranged in an arc.

6. The feeder of claim 5 wherein the arc of said position adjusting openings is positioned generally below the pivot axis for said first cam.

7. The feeder of claim 1 wherein said control rod defines a handle, said finger extending from said handle.

8. The feeder of claim 1 wherein said control cam is a first control cam; said second cam being a second control cam; said control arm including a second finger, said second finger being positioned and sized to be selectively engagable with a selected one of said adjustment positioning openings of the second control cam; whereby, said adjustment mechanism can be operated from either a first end or a second end of said feeder.

9. The feeder of claim 8 wherein said control arm is made of a material sufficiently stiff such that disengagement of either said first or second finger from its associated control cam disengages the other of the first and second finger from its associated control cam.

10. The feeder of claim 1 wherein said second cam is a controlled cam.

11. The feeder of claim 10 wherein control rod includes second handle proximate an end of said control rod opposite the junction of the control rod with the control cam.

12. The feeder of claim 10 wherein said control cam and said controlled cam are proximate the end walls of said hopper.

13. The feeder of claim 1 wherein said hopper wall includes a generally vertically oriented elongate slot; said first and second cams each being rotatable about an axle assembly; the axle assembly including an axle member extending from said hopper wall and a tightener proximate a free end of said axle member; said tightener being movable between a first position in which said axle assembly is movable along said slot a second position in which said axle assembly is positionally fixed relative to said slot.

14. The feeder of claim 13 wherein said axle member comprises a threaded shaft, and said tightener comprises a nut threadedly received on said threaded shaft.

15. The feeder of claim 13 wherein said axle assembly comprises a spacer; said spacer spacing said cam a determined distance from said hopper wall.

16. An animal feeder comprising:
a hopper defined by a bottom surface, opposed end walls, and opposed hopper walls;
at least one trough defined by a bottom surface, opposed end walls, a trough wall, and a portion of at least one hopper wall; said trough being in communication with said hopper via an opening defined, at least in part, by said hopper wall;
a gate extending the length of the opening; said gate being movable to adjust the effective height of the opening; and
a first adjustment mechanism mounted to said hopper wall and a second adjustment mechanism mounted to said hopper wall spaced from said first adjustment mechanism; said first and second adjustment mechanisms each comprising:
 a control cam rotatably mounted to said one of said hopper walls; said control cam being rotatable about a pivot axis; said control cam comprising two or more position adjusting openings spaced from the pivot axis for said control cam;
 a link extending between and connecting said control cam to said gate; said link being connected to said control cam at a first connection point on said control cam spaced from said pivot point of said control cam, such that rotation of said control cam is translated to vertical motion of said link; and
 a control rod extending from said control cam; said control rod being pivotally connected to said control cam at a second connection point, said second connection point being offset from said pivot axis of said control cam such that movement of said control rod rotates said control cam about said pivot axis; said control rod including a finger sized to engage a selected one of said adjustment position openings.

17. The feeder of claim 16 wherein said control rod is made from a material which will bias said control rod finger to remain engaged with one of said adjustment position openings.

18. The feeder of claim 17 wherein said control rod applies a torsional force, a bending force, or a weight force to urge said finger into engagement with said control cam.

19. The feeder of claim 17 wherein including a spring member extending between said control rod and said control cam.

20. The feeder of claim 16 wherein said control rod finger is shaped relative to said adjustment position openings to physically and or frictionally maintain said finger in engagement with said control cam.

21. The feeder of claim 16 wherein said control rod of said first adjustment mechanism is operatively connected to the control rod of said second adjustment mechanism.

22. The feeder of claim 16 wherein said adjustment mechanisms each comprise means for maintaining a set angular orientation of said control bar relative to said hopper wall.

23. The feeder of claim 22 wherein said means comprises a guide; said guide defining a passage which slidably receives at least a part of the control rod.

24. The feeder of claim 23 wherein said guide is a tube mounted to the hopper wall and through which said control rod slides or a slot formed in said hopper wall and through which at least a part of said control rod slides.

25. The feeder assembly of claim 22 wherein said means comprises a controlled cam rotatably mounted to said hopper wall spaced from said control cam; said control bar being operatively and rotatably connected to said controlled cam.

26. An adjustment mechanism for adjusting the position of a gate of a feeder; the adjustment mechanism comprising:
a control cam having an axis of rotation and two or more position adjusting openings spaced from the axis of rotation;
a link extending from said cam; said link being rotatably connected at a first end to said cam at a first connection point on said cam spaced from said axis of rotation; said link having a second end adapted to be connected to the gate of said feeder;
a control rod extending from said cam; said control rod being pivotally connected to said cam at a second connection point, said second connection point being offset from said axis of rotation; said control rod including a handle having a finger sized to engage a selected one of said adjustment position openings; and
means for maintaining a set angular orientation of said control bar relative to a wall of the hopper when the adjusting means is mounted in a feeder.

27. The adjustment mechanism of claim 26 wherein said control rod finger is maintained in engagement with one of said adjustment position openings due to a weight force, linear spring force or torsional spring force generated by said control rod, and/or by a physical interaction of said finger with said control cam adjustment opening.

28. The adjustment mechanism of claim 27 wherein said physical interaction comprises a friction fit of said finger with said control cam adjustment opening.

29. The adjustment mechanism of claim 26 wherein said means comprises a guide; said guide defining a passage which slidably receives at least a part of said control bar.

30. The adjustment mechanism of claim 29 wherein said guide is a tube mounted to the hopper wall and through which said control rod slides or a slot proximate said hopper wall through which at least a part of said control rod slides.

31. The adjustment mechanism claim 30 wherein said tube comprises a bushing.

32. The adjustment mechanism of claim 26 wherein said means comprises a second cam; said second cam having an axis of rotation; said control bar being operatively and rotatably connected to said second cam at a point offset from said axis of rotation of said second cam.

33. The adjustment mechanism of claim 32 wherein said second cam is a control cam.

34. The adjustment mechanism of claim 32 wherein said second cam is a controlled cam.

35. The adjustment mechanism of claim 32 including a second link extending from said second cam; said second link being rotatably connected at a first end to said second cam at a point on said second cam spaced from said axis of rotation of said second cam; said second link having a second end adapted to be connected to the gate of said feeder.

* * * * *